(12) United States Patent
Kim et al.

(10) Patent No.: US 10,254,735 B2
(45) Date of Patent: Apr. 9, 2019

(54) NETWORK SYSTEM AND METHOD FOR CONTROLLING THE SAME

(71) Applicant: LG ELECTRONICS, INC., Seoul (KR)

(72) Inventors: Jusu Kim, Seoul (KR); Sangwon Kim, Seoul (KR); Daehyun Choi, Seoul (KR); Kyoungteak Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 291 days.

(21) Appl. No.: 15/051,160

(22) Filed: Feb. 23, 2016

(65) Prior Publication Data
US 2016/0266562 A1    Sep. 15, 2016

(30) Foreign Application Priority Data

Mar. 11, 2015 (KR) .................. 10-2015-0033966

(51) Int. Cl.
| | | |
|---|---|---|
| G05D 17/00 | (2006.01) | |
| G05B 19/048 | (2006.01) | |
| H04L 12/12 | (2006.01) | |
| H04L 12/28 | (2006.01) | |
| F24F 5/00 | (2006.01) | |
| H02J 3/14 | (2006.01) | |
| F24F 140/50 | (2018.01) | |
| F24F 11/46 | (2018.01) | |

(52) U.S. Cl.
CPC .......... *G05B 19/048* (2013.01); *F24F 5/0096* (2013.01); *H04L 12/12* (2013.01); *H04L 12/2803* (2013.01); *F24F 11/46* (2018.01); *F24F 2140/50* (2018.01); *G05B 2219/2639* (2013.01); *H02J 2003/143* (2013.01); *H02J 2003/146* (2013.01); *Y02B 70/3266* (2013.01); *Y02B 70/3275* (2013.01); *Y02D 50/40* (2018.01); *Y04S 20/224* (2013.01); *Y04S 20/242* (2013.01); *Y04S 20/244* (2013.01)

(58) Field of Classification Search
CPC ............... G05B 19/048; F24F 5/0096; F24F 2011/0046; H04L 12/12; H04L 12/2803
USPC ...................................................... 700/291
See application file for complete search history.

(56) References Cited

U.S. PATENT DOCUMENTS

2010/0324962 A1    12/2010  Nesler et al.
2015/0276253 A1*  10/2015  Montalvo ............... G06Q 10/06
                                                  700/276

FOREIGN PATENT DOCUMENTS

| CN | 103472785 A | 12/2013 |
|---|---|---|
| EP | 2416465 A2 | 2/2012 |
| JP | 2014-115878 A | 6/2014 |

(Continued)

*Primary Examiner* — Huan Hoang
(74) *Attorney, Agent, or Firm* — Dentons US LLP

(57) ABSTRACT

A network system and a method for controlling the same include where a power consumption amount of an electrical appliance is monitored based on an operation of the electrical appliance. If a demand response (DR) signal for requesting power saving is received, it is determined whether a user is to participate in a DR event for a power-saving operation of the electrical appliance. If it is determined that the user is to participate in the DR event, the power-saving operation of the electrical appliance is performed based on previously mapped information on a discomfort caused by the power-saving operation of the electrical appliance.

12 Claims, 7 Drawing Sheets

(56) References Cited

FOREIGN PATENT DOCUMENTS

| KR | 10-2011-0067201 A | 6/2011 |
|----|-------------------|--------|
| KR | 1020110114437 A | 10/2011 |
| KR | 1020130124499 A | 11/2013 |
| WO | 2010/042550 A2 | 4/2010 |

* cited by examiner

NETWORK SYSTEM AND METHOD FOR CONTROLLING THE SAME

CROSS-REFERENCE TO RELATED APPLICATIONS

The present application claims priority under 35 U.S.C. 119 and 35 U.S.C. 365 to Korean Patent Application No. 10-2015-0033966 (filed on Mar. 11, 2015), which is incorporated by reference in its entirety for all purposes as if fully set forth herein.

BACKGROUND

The present disclosure relates to a network system and a method for controlling the same.

In general, electrical appliances provided in homes include washers, refrigerators, cookers, cleaners, etc. With the development of communication technology, a plurality of electrical appliances provided in a home can be connected to a network.

In addition, a user can monitor operating statuses of the plurality of electrical appliances connected to the network or control an operation of each of the plurality of electrical appliances by using a predetermined terminal even outdoors. As a network system of electrical appliances is implemented, IT technology is added to a home environment, so that it is possible to build a smart home that enables users to live a convenient life.

The present applicant has filed an application (hereinafter, referred to as a prior art) related to such smart home technology.

1. Application number (filing date) of prior art: 10-2003-0093196 (Dec. 18, 2003)
2. Title of disclosure: Method for controlling smart washer using the home network Meanwhile, when a user desires to purchase an electrical appliance, power consumption or electric charges of the electric appliance occupies a considerable weight. In this case, the power-saving performance of the electrical appliance is important. However, it is also important whether a device capable of efficiently managing power used in homes is provided in the electrical appliance.

Particularly, there is required a device or method for providing an effective countermeasure when a signal for power saving, i.e., a demand response (DR) signal is received from an energy supplier due to a crisis of power supply.

However, according to the above-described prior art, it is limited to save power while minimizing user's inconvenience in response to the DR signal.

SUMMARY

Embodiments provide a network system and a method for controlling the same, which can guide a user to save power of electrical appliances while reducing user's inconvenience.

In one embodiment, a method for controlling a network system includes: monitoring a power consumption amount of an electrical appliance, based on an operation of the electrical appliance; if a demand response (DR) signal for requesting power saving is received, determining whether a user is to participate in a DR event for a power-saving operation of the electrical appliance; and if it is determined that the user is to participate in the DR event, performing the power-saving operation of the electrical appliance, based on previously mapped information on a discomfort caused by the power-saving operation of the electrical appliance.

The method may include: if the DR signal is received, calculating a predicted power consumption amount of the electrical appliance to be saved; and determining information on a predicted incentive corresponding to the saved power consumption amount.

The method may further include determining whether the user is to participate in the DR event, based on the calculated predicted power consumption of the electrical appliance.

If it is determined that the user is to turn off the electrical appliance so as to achieve a saved power consumption amount requested in the DR signal, it may be determined that the user's participation in the DR event is impossible.

The previously mapped information on the discomfort may include information graded based on a discomfort degree for each user.

The electrical appliance may include a plurality of electrical appliances. When the power-saving operation for power saving is performed, a discomfort level of one electrical appliance and a discomfort level of another electrical appliance may be determined to be different from each other.

The performing of the power-saving operation of the electrical appliance may include performing a power-saving operation on an electrical appliance having a relatively low discomfort level among the plurality of electrical appliances.

The method may further include, if it is determined that the user is to participate in the DR event, displaying information on the kind of an electrical appliance on which a power-saving operation is to be performed, information on a time section where the DR event is performed, information on a possible power-saving amount, or information on an incentive corresponding to power saving.

The method may further include, if it is determined that the user's participation in the DR event is impossible, outputting guide information for determining whether the electrical appliance is to be turned off.

The method may further include, if the power-saving operation of the electrical appliance is performed as the user participates in the DR event, displaying information on an actual power-saving amount and information on an incentive to be provided.

The method may further include setting information on a discomfort having a plurality of levels, based on a previously set factor.

The method may further include: in a state in which the information on the discomfort is set, learning information on a use pattern corresponding to an operation of the electrical appliance; and learning external information transmitted from an energy supplier or an external database.

The information on the use pattern may include a power consumption amount of the electrical appliance, an operating time of the electrical appliance, or a number of operating times of the electrical appliance, and the external information may include time information, weather information, or temperature information.

If the DR signal is received, the information on the discomfort may be maintained or changed based on the information on the use pattern of the electrical appliance, the external information, and whether the user is to participate in the DR event.

The previously set factor may include at least one of external temperature information, an operating time or a number of use times of the electrical appliance, and weather information.

The information graded based on the discomfort degree for each user may be manually input.

The method may further include, when the incentive is equal to or greater than a set cost, inputting a command for allowing the user to participate in the DR event regardless of the discomfort level.

The details of one or more embodiments are set forth in the accompanying drawings and the description below. Other features will be apparent from the description and drawings, and from the claims.

DETAILED DESCRIPTION OF THE EMBODIMENTS

Figure 1:
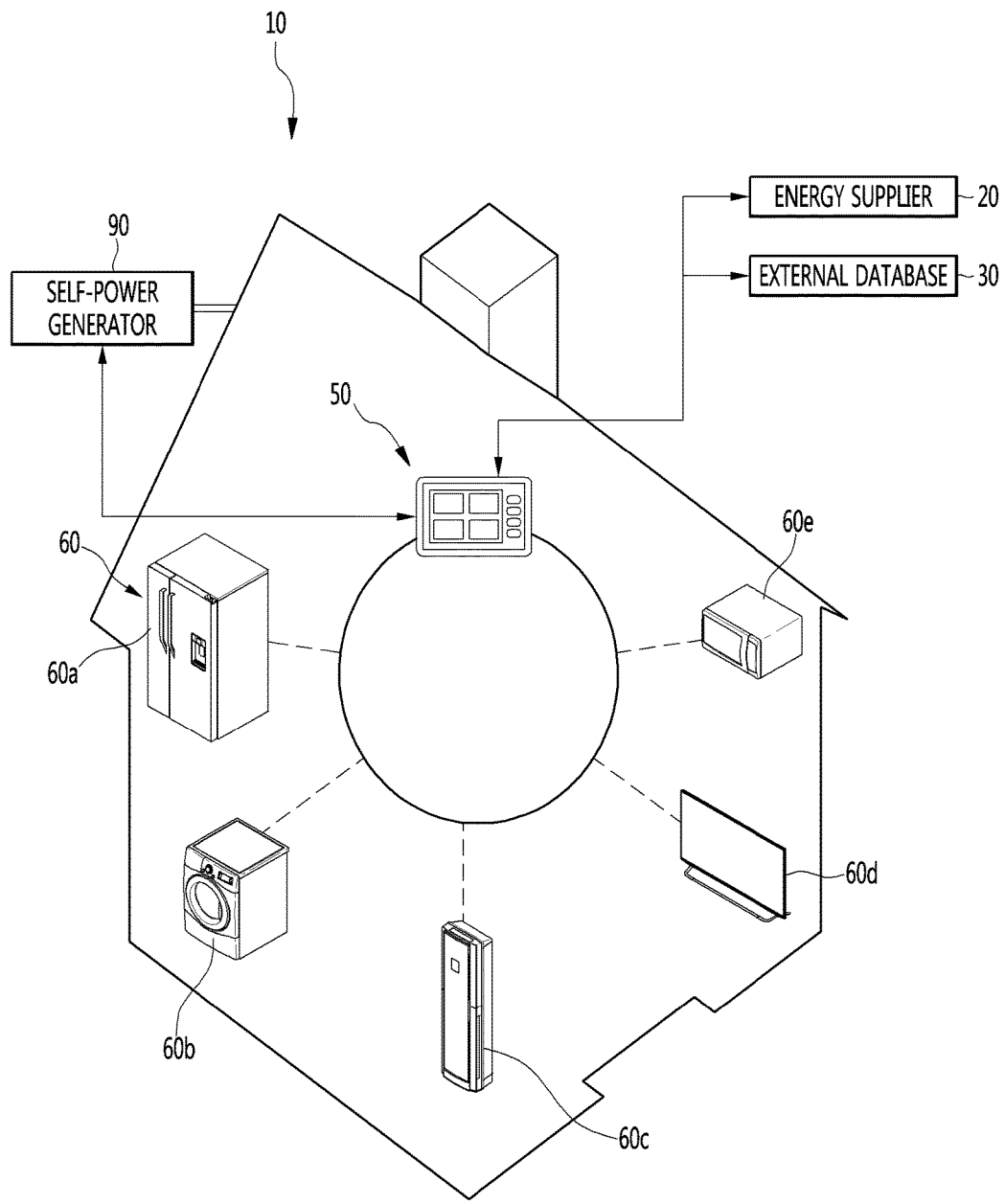
FIG. 1 is a diagram illustrating a configuration of a network system according to an embodiment of the present disclosure.

Reference will now be made in detail to the embodiments of the present disclosure, examples of which are illustrated in the accompanying drawings. In the following description, detailed explanation of known related functions and constitutions may be omitted to avoid unnecessarily obscuring the subject manner of the present disclosure. Throughout the drawings, like elements are designated by like reference numerals.

Figure 2:
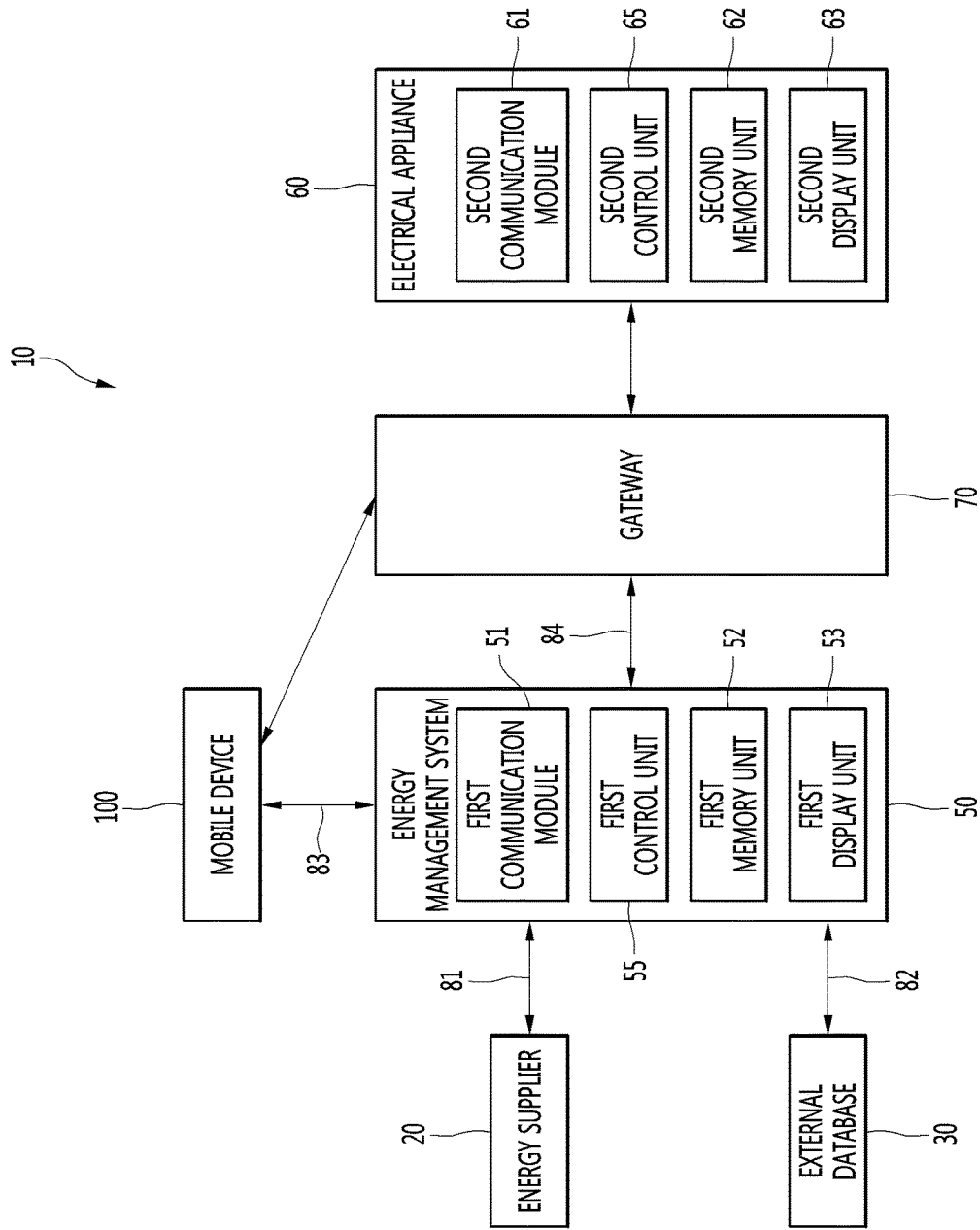
FIG. 2 is a block diagram illustrating a configuration of the network system according to the embodiment.

FIG. 1 is a diagram illustrating a configuration of a network system according to an embodiment. FIG. 2 is a block diagram illustrating a configuration of the network system according to the embodiment.

Referring to FIGS. 1 and 2, the network system 10 according to the embodiment a plurality of electrical appliances 60 provided in a house (or home) and an energy management system 50 capable of monitoring operational information of the plurality of electrical appliances 60 or controlling operations of the plurality of electrical appliances 60. For example, the plurality of electrical appliances 60 may include a refrigerator 60a, a washer 60b, an air conditioner 60c, a TV 60d, a cooker 60e, etc. Although not shown in these figures, the plurality of electrical appliances 60 may further include an illuminator.

The energy management system 50 may be provided as an independent device separated from the plurality of electrical appliances 60, or may be mounted in any one of the plurality of electrical appliances 60. For example, the energy management system 50 may be mounted in the TV 60d.

The network system 10 may further include an energy supplier 20 provided to be communicable with the energy management system 50, the energy supplier 20 supplying power to the plurality of electrical appliances 60 provided in the house.

The energy supplier 20 may transmit, to the energy management system 50, information on power, i.e., information on power supply or information on power cost. For example, the energy supplier 20 may transmit, to the energy management system 50, information that as the current demand for power increases, the power supply is unstable and the power cost is expensive or information that as the current demand for power decreases, power supply is stable and the power cost is inexpensive.

Also, the energy supplier 20 may transmit a demand response (DR) signal to the energy management system 50. Here, the DR signal refers to a signal capable of being transmitted to a user side, i.e., the energy management system 50 or the electrical appliance 60 when it is required to save power consumption due to a crisis of power supply.

When the DR signal is received, the user side may determine whether to participate in a DR event by accepting a request for power saving. When the user side performs a power-saving operation by participating in the DR event, the energy supplier 20 may provide an incentive to the user side, based on a power-saving amount.

The energy supplier 20 and the energy management system 50 may transmit or receive information to or from each other through a first communication interface 81. For example, the first communication interface 81 may include Ethernet or Internet as a short-range communication network.

The network system 10 may further include an external database 30 provided to be communicable with the energy management system 50. The energy management system 50 and the external database 30 may transmit or receive information to or from each other through a second communication interface 82. For example, the second communication interface 82 may include Ethernet or Internet.

The energy management system 50 may receive, from the external database 30, information not stored in the energy management system 50 or the plurality of electrical appliances 60, i.e., external information, through communication connection with the external database 30. For example, the external information may include information on time, weather, temperature, etc.

The network system 10 may further include a mobile device 100 capable of being operated by a user. The user may be communicatively connected to the energy management system 50 by using the mobile device 100. The user may monitor operational information of the plurality of electrical appliances 60 or controlling operations of the plurality of electrical appliances 60 by using the mobile device 100. The mobile device 100 may include a display device for displaying operational information of the electrical appliances 60.

Specifically, the mobile device 100 and the energy management system 50 may be communicatively connected to each other through a third communication interface 83. For example, the third communication interface 83 may include Internet.

The network system 10 may further include a gateway 70 for connecting the energy management system 50 and the plurality of electrical appliances 60 to communicate each other. For example, the gateway 70 may include an access point (AP). The energy management system 50 and the gateway 70 may be communicatively connected to each other through a fourth communication interface 84. For example, the fourth communication interface 84 may include WiFi.

The energy management system 50 is communicatively connected to the plurality of electrical appliances 60 through the gateway 70, to receive operational information of the plurality of electrical appliances 60, e.g., power use information. Meanwhile, the mobile device 100 may be connected to the energy management system 50 or the plurality of electrical appliances 60 through the gateway 70.

As described above, various communication schemes have been proposed as the first to fourth communication interfaces 81, 82, 83, and 84, but the present disclosure is not limited thereto. Another communication scheme, i.e., Bluetooth, Ad-hoc, Zigbee, or the like may be used as long as it can network the component 20, 30, 50, 60, 70, and 100 of the network system 10.

The energy management system 50 may include a first communication module 51 communicatively connected to the energy supplier 20, the external database 30, the mobile device 100 or the gateway 70. The first communication module 51 may be configured with one or more devices connectable to the first to fourth communication interfaces 81, 82, 83, and 84.

The energy management system 50 may further include a first memory unit 52 for storing information related to operations of the plurality of electrical appliances 60. For example, the first memory unit 52 may store information on use patterns of the electrical appliances 60 as described in the following Table 1. The information on use patterns of the electrical appliances 60 may include information on use times of the electrical appliances, energy consumption amounts of the electrical appliances, control factors of the electrical appliances, and energy-saving amounts of the electrical appliances.

TABLE 1

|  | Air conditioner | Refrigerator | Washer |
|---|---|---|---|
| Use time | 13:00~18:00 | Always | 07:00~11:00 18:00~21:00 |
| Energy consumption amount | Large | Large | Small |
| Control factor | Temperature | Defrosting & additional function | Washing cycle |
| Energy-saving amount | Large | Middle | Small |

Specifically, referring to Table 1, the first memory unit 52 of the energy management system 50 may store information on use times of the plurality of electrical appliances 60. For example, the first memory unit 52 may store that the use time of the air conditioner is 13:00 to 18:00, the refrigerator is always operated, and the use time of the washer is 07:00 to 11:00 and 18:00 to 21:00.

The use time of the electrical appliance 60 may be determined based on an operating time used within a set period. For example, the set period may be one month or one week. In addition, the start point and end point of the use time, based on one day, may be determined based on the earliest time value and the latest time value of a plurality of time sections within the set period.

The first memory unit 52 may store an energy consumption amount of each electrical appliance 60, i.e., a power consumption amount of each electrical appliance 60. For example, the energy consumption amounts of the air conditioner and the refrigerator may be relatively large, and the energy consumption amount of the washer may be relatively small. It may be determined, based on a set power amount, whether the energy consumption amount is large or small.

The first memory unit 52 may store information on a control factor of each electrical appliance 60. Here, the control factor refers to a factor manually controlled by a user or self-controlled by the electrical appliance 60. For example, the control factor of the air conditioner may be "temperature," the control factor of the refrigerator may be "defrosting and additional function," and the control factor of the washer may be "washing cycle."

The first memory unit 52 may store information on energy-saving amounts (power-saving amounts) obtained by controlling the control factors. For example, the energy-saving amount of the air conditioner may be relatively large by controlling the "temperature" as the control factor of the air conditioner, the energy-saving amount of the refrigerator may be relatively middle by controlling the "defrosting and additional function" as the control factor of the refrigerator, and the energy saving of the washer may be relatively small by controlling the "washing cycle" as the control factor of the washer.

The first memory unit 52 may further store information obtained by grading and mapping factors that cause users to feel discomfort according to users' propensities.

For example, in the case of a specific electrical appliance, a user may sensitively react with temperature information, e.g., an external temperature, to control an operation of the electrical appliance, and another user may sensitively react an operating time or a number of use times rather than the temperature information, to control an operation of the electrical appliance. In addition, still another user may sensitively react weather information (sunny, cloudy, and rainy), to control an operation of the electrical appliance.

As such, degrees (discomforts) where users feel discomfort about a specific factor are different according to users' propensities. Therefore, factors that may cause users to feel discomfort for each electrical appliance may be previously determined, a level may be provided for each factor, and information on the factors having levels may be stored in the first memory unit 52. When a DR signal is received from the energy supplier 20, the energy management system 50 may guide whether a user is to participate in a DR event or control a power-saving operation of the electrical appliance, based on the stored information on discomfort levels.

As an example, as shown in the following Table 2, the factors that may cause users to feel discomfort in the air conditioner may include external temperature/humidity information, time information, and weather information. In addition, a factor to be most kept in mind when the operation of the air conditioner is controlled may be changed for each user. Therefore, the factor may be set to a discomfort level where users are to be ready to suffer the discomfort.

TABLE 2

| Air conditioner | Discomfort level | | | |
|---|---|---|---|---|
| Level | Level 1 | LEVEL 2 | LEVEL 3 | LEVEL 4 |
| Discomfort factor | [External temperature/ humidity] 30° C./70% or more | [Time information] 12:00~15:00 | [Weather information] Rainy | Another condition |

Referring to Table 2, in the air conditioner, the discomfort factors that cause users to feel comfort may include external temperature/humidity, time information, and weather information. For example, if the external temperature/humidity is 30° C./70% or more, the external temperature/humidity may be Level 1 where a user may feel a relatively greatest discomfort. If the time information is 12:00 to 15:00, the time information may be Level 2 where the discomfort is slightly reduced as compared with Level 1.

If the weather information is in a state of "rainy," the weather information may be Level 3 where the discomfort is slightly reduced as compared with Level 2. A condition except Levels 1 to 3 is defined as Level 4 where the discomfort is relatively weakest.

The external temperature/humidity may be recognized through a sensor provided in the air conditioner or the external database 30. The time information and the weather information may be recognized through the external database 30.

Thus, if the condition at the time when a DR signal is received from the energy supplier 20 belongs to Levels 1 to 4, the energy management system 50 can recognize the corresponding discomfort level and guide the recognized information to a user.

When a user participates in a DR event, it is inevitable that a discomfort will be caused. However, the possibility or availability where the user is ready to suffer the discomfort may be changed depending on a level of the discomfort.

For example, if the condition at the time when a DR signal is received from the energy supplier 20 belongs to Level 4, the user may be easily ready to suffer the discomfort and participate in the DR event. On the other hand, if the condition at the time when a DR signal is received from the energy supplier 20 belongs to Level 1, the user is not easily ready to suffer the discomfort, and therefore, may determine not to participate in the DR event.

As another example, as shown in the following Table 3, the factors that may cause users to feel discomfort in the refrigerator may include indoor temperature/humidity information, food deterioration information, and season information. In addition, a factor to be most kept in mind when the operation of the refrigerator is controlled may be changed for each user. Therefore, the factor may be set to a discomfort level where users are to be ready to suffer the discomfort.

TABLE 3

| Refrigerator | Discomfort level | | | |
|---|---|---|---|---|
| Level | Level 1 | LEVEL 2 | LEVEL 3 | LEVEL 4 |
| Discomfort factor | [Indoor temperature/ humidity] 30° C./70% or more | [Food deterioration information] Attention state of viruses/ bacteria | [Weather information] Summer | Another condition |

Referring to Table 3, in the refrigerator, the discomfort factors that cause users to feel comfort may include indoor temperature/humidity, food deterioration information, and weather information. For example, if the indoor temperature/humidity is 28° C./70% or more, the indoor temperature/humidity may be Level 1 where a user may feel a relatively greatest discomfort. If an attentional state in which viruses/bacteria are actively propagated becomes effective with respect to the food deterioration information, the food deterioration information may be Level 2 where the discomfort is slightly reduced as compared with Level 1.

If the weather information is "summer," the weather information may be Level 3 where the discomfort is slightly reduced as compared with Level 2. A condition except Levels 1 to is defined as Level 4 where the discomfort is relatively weakest.

The indoor temperature/humidity information, the food deterioration information, and the weather information may be recognized through the external database 30.

Thus, if the condition at the time when a DR signal is received from the energy supplier 20 belongs to Levels 1 to 4, the energy management system 50 can recognize the corresponding discomfort level and guide the recognized information to a user.

For example, if the condition at the time when a DR signal is received from the energy supplier 20 belongs to Level 4, the user may be easily ready to suffer the discomfort and participate in the DR event. On the other hand, if the condition at the time when a DR signal is received from the energy supplier 20 belongs to Level 1, the user is not easily ready to suffer the discomfort, and therefore, may determine not to participate in the DR event.

Mapping information on discomfort levels for each factor corresponding to Tables 2 and 3 may be manually set by a user, or may be automatically set as previously set information. It will be apparent that the set mapping information may be changed later depending on a use pattern of the air conditioner or the refrigerator or whether a user is to participate in a DR event.

In the embodiment, the discomfort levels in the air conditioner and the refrigerator have been described through Tables 2 and 3. However, discomfort levels in the washer, the illuminator, or the TV may be set by changing factors that cause users to feel discomfort.

The energy management system 50 may further include a first display unit 53 capable of displaying information on power consumption amounts of the plurality of electrical appliances 60, based on operational information of the plurality of electrical appliances 60. Information on DR signals received from the energy supplier 20 may be displayed on the first display unit 53.

Each of the plurality of electrical appliances 60 may include a second communication module 61 communicatively connected to the gateway 70, a second memory unit 62 for storing information related to an operation of the electrical appliance 60, a second display unit 63 for displaying information related to an operation of the electrical appliance 60, and a second control unit 65 for controlling the operation of the electrical appliance 60.

The network system 10 may further include a self-power generator 90 capable of self-generating power in the home. For example, the self-power generator 90 may include a solar cell, a battery, a wind power generator, etc.

The power required to operate the electrical appliances 60 is first supplied from the self-power generator 90. When power is insufficient, the insufficient power may be supplied from the energy supplier 20.

Figure 3:
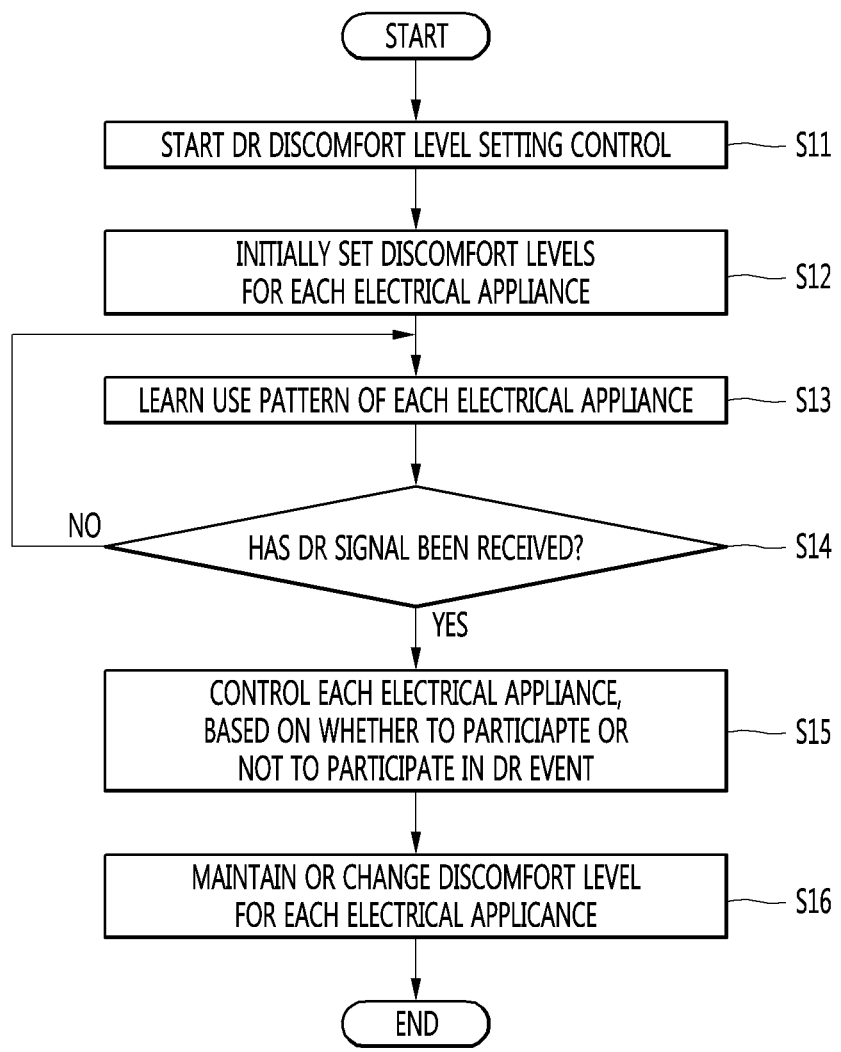
FIG. 3 is a flowchart illustrating a method for setting discomfort levels for each electrical appliance according to the embodiment.

FIG. 3 is a flowchart illustrating a method for setting discomfort levels for each electrical appliance according to the embodiment.

DR discomfort setting control is started (S11). For example, a predetermined input for setting discomfort levels may be performed through a display device provided in the energy management system 50, any one of the plurality of electrical appliances 60, or the mobile device 100.

Information on discomfort levels for each electrical appliance may be initially set (S12). As an example, a user may manually input information corresponding to the information mapped to Tables 2 and 3. Specifically, the user may input information through an input device. The input device may include an input unit provided in the energy management system 50, each of the plurality of electrical appliances 60, or the mobile device 100. As another example, although the user does not input information, previously determined initial setting information on discomfort levels may be recognized.

A plurality of electrical appliances 60 may be operated in the state in which the discomfort levels are initially set. The plurality of electrical appliances 60 may be operated during a set period, and a use pattern of each electrical appliance 60 may be learned (S13). For example, information on the use pattern may include information on a power consumption amount of the electrical appliance, an operating time of the electrical appliance, or a number of use times of the electrical appliance.

In the process of operating the plurality of electrical appliances 60, external information transmitted from the energy supplier 20 or the external database 30 may be learned.

As an example, if an external temperature is equal to or greater than a predetermined temperature, the user may turn on the air conditioner to perform a cooling operation, and information that a power consumption amount of A is used may be learned. As another example, if an external humidity is equal to or greater than a predetermined humidity, information that the washer is not operated may be learned.

As still another example, information that the opening of a door of the refrigerator is concentrated on 07:00 to 09:00 and 17:00 to 20:00 may be learned.

As such, in the process of performing the operation of the electrical appliance 60 and the learning of the use pattern, it may be recognized whether a DR signal has been received from the energy supplier 20 (S14). The DR signal may include information for requesting the user to save a power consumption amount due to a crisis of power supply. For example, the DR signal may include information that "the power consumption amount in the home should be maintained to 50 KWh or less from 13:00 to 15:00 today" and information that "when the power consumption amount is saved by participating in a DR event, its incentive is 200 won (Korean currency)/KWh."

The energy management system 50 determines whether to perform a power-saving operation of the electrical appliance in response to the signal for power saving, based on a current power consumption amount in the home. If it is recognized that the power consumption amount (50 KWh) is to be achieved by performing the power-saving operation, the energy management system 50 determines a power consumption amount to be used in each electrical appliance and determines an operating method of the electrical appliance, based on the determined power consumption amount.

If the operating method of the electrical appliance is determined, a user's discomfort may be caused. Based on the information mapped in Tables 2 and 3, discomfort levels to be caused through the power-saving operation of each electrical appliance are determined. The energy management system 50 may guide, to the user, information on discomfort levels where the user is to be ready to suffer the discomfort when participating in a DR event.

The user may determine whether to participate in the DR event, based on the guided information on discomfort levels. Although power cost increases and the user acquires no incentive, the user may not feel the discomfort. Therefore, the user may not participate in the DR event.

As such, the user may participate or may not participate in the DR event and then control the operation of the electrical appliance (S15). After it is determined whether the user is to participate in the DR event, the use pattern of the electrical appliance may be again learned.

After the power-saving operation for power saving is performed in response to the DR signal, the discomfort level for each electrical appliance may be maintained or changed based on information on whether the user is to participate in the DR event and information on the learning of the use pattern of the electrical appliance (S16).

For example, when the user participates in the DR event, based on the discomfort level determined by the power-saving operation of the electrical appliance, the level of a corresponding factor may be downgraded. That is, when the level of the corresponding factor is Level 1, the level may be downgraded to Level 2. When the level of the corresponding factor is Level 3, the level may be downgraded to Level 4.

On the other hand, when the user does not participate in the DR event, based on the discomfort level determined by the power-saving operation of the electrical appliance, the level of the corresponding factor may be upgraded. That is, when the level of the corresponding factor is Level 3, the level may be upgraded to Level 2. When the level of the corresponding factor is Level 4, the level may be upgraded to Level 3. It will be apparent that when the level of the corresponding factor is Level 1, the level may be maintained.

Specifically, in the air conditioner, when the user participates in the DR event even though the discomfort level is Level 1 because the external temperature at the time when the DR signal is received is 31° C., the condition of Level 1, i.e., the condition of external temperature/humidity in Table 2 may be changed to Level 2.

In the refrigerator, when the food deterioration information related to Level 2 at the time when the DR signal is received becomes effective as an "attentional state of viruses/bacteria," and the user participates in the DR event, the condition of Level 2, i.e., the condition of food deterioration information may be changed to Level 1.

Meanwhile, when the DR signal is received, the user may input intensive information as a condition in which the user participates in the DR event regardless of the discomfort level. For example, when the intensive is provided as 300 won/KWh, the user may input a command that the user is to participate in the DR event regardless of the discomfort level.

As described above, discomfort levels are previously graded and mapped according to users' propensities, and information on discomfort levels where a user is to be ready to suffer discomfort when the user participate in a DR event is provided, so that it is possible to assist the user to determine whether to participate in the DR event. Thus, it is possible to perform a power-saving operation of an electrical appliance by considering a user's discomfort.

Figure 4:
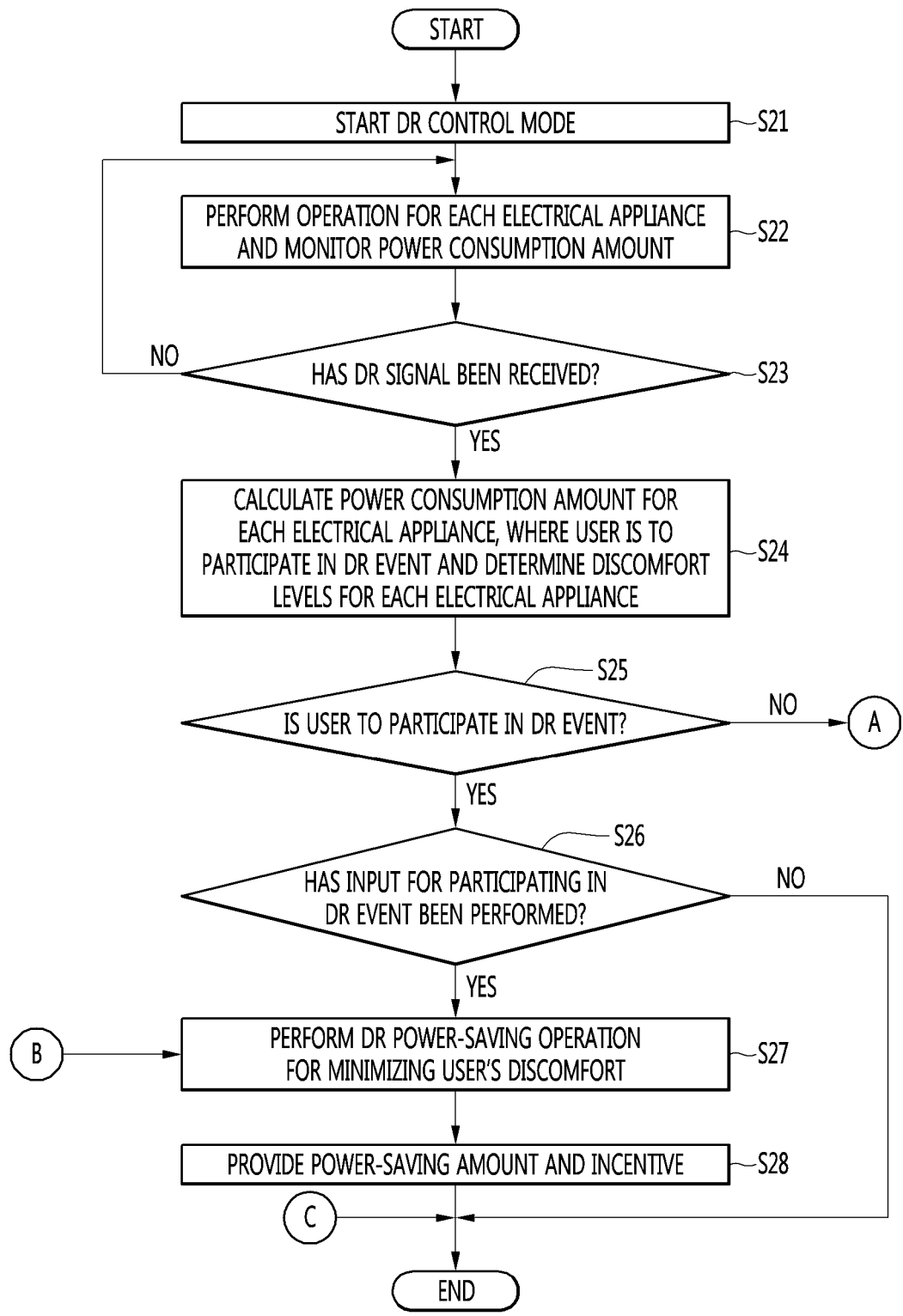
FIGS. 4 and 5 are flowcharts illustrating a method for performing a power-saving operation of an electrical appliance, based on a demand response (DR), according to the embodiment.
Figure 5:
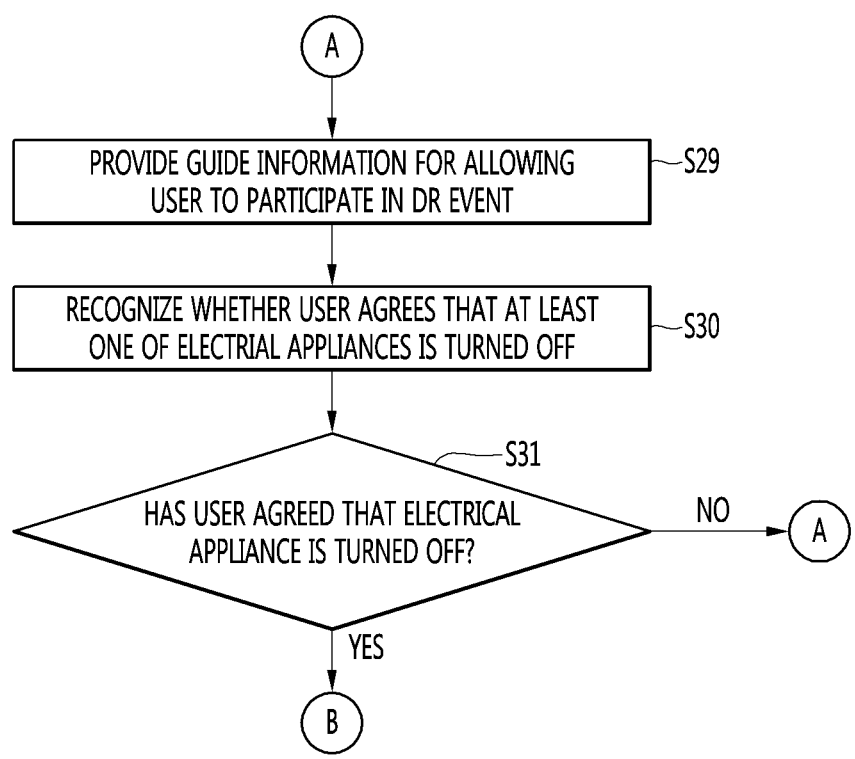
Figure 6A:
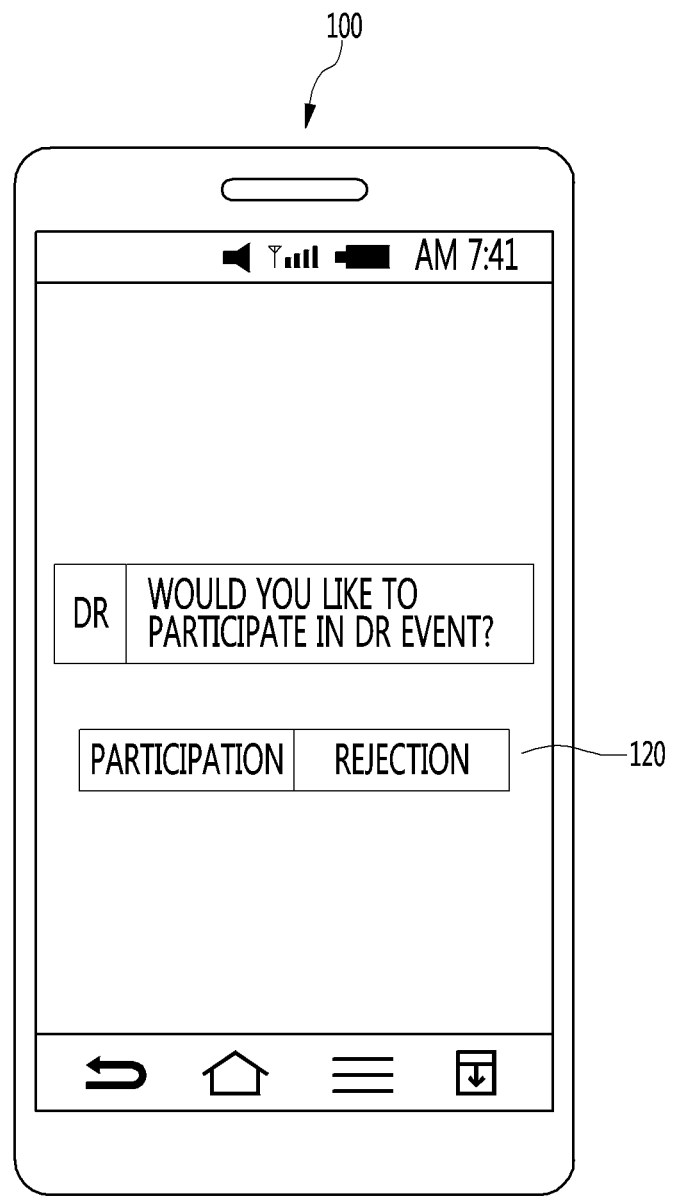
FIGS. 6A and 6B are diagrams illustrating configurations of a display unit of a mobile device according to another embodiment.
Figure 6B:
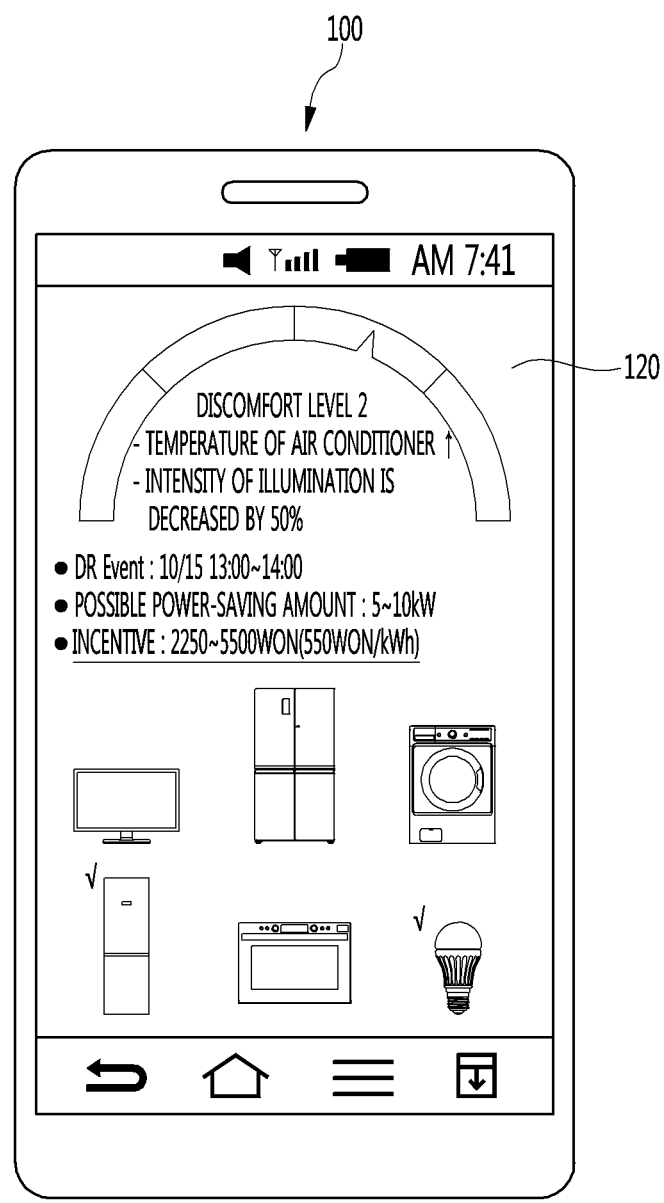

FIGS. 4 and 5 are flowcharts illustrating a method for performing a power-saving operation of an electrical appliance, based on a DR, according to the embodiment. FIGS. 6A and 6B are diagrams illustrating configurations of a display unit of a mobile device according to another embodiment. A method for performing a power-saving operation of an electrical appliance will be described with reference to FIGS. 4 to 6.

A DR control mode is started (S21). A predetermined input for performing the DR control mode may be performed through the display device provided in the energy management system 50, any one of the plurality of electrical appliances 60, or the mobile device 100.

If the DR control mode is performed, the plurality of electrical appliances 60 may be operated. In this process, a use pattern of each electrical appliance 60 may be learned. For example, information on the use pattern may include information on a power consumption amount of the electrical appliance, an operating time of the electrical appliance, or a number of use times of the electrical appliance. Particularly, a power consumption amount corresponding to the operation of the electrical appliance 60 may be monitored (S22).

It may be recognized whether a DR signal has been received from an energy supplier 20 (S23). If the DR signal is received, a control mode of the electrical appliance for power saving is determined to achieve power saving in response to the DR signal.

For example, if the air conditioner is being operated, a user may control a set temperature to be increased (in a cooling operation) or decreased (in a heating operation) by a first set value. If the refrigerator is being operated, the user may control set temperatures of refrigerating and freezing rooms of the refrigerator to be increased by a second set value.

If the user is watching the TV, the user may control the intensity of illumination of the TV to be decreased. If the washer is being operated, the user may control cycles of the washer to be performed after a time section to which the DR signal is applied.

If the control mode of the electrical appliance 60 is determined, a power consumption amount for each electrical appliance 60, where the user is to participate in a DR event may be calculated (S24). That is, a predicted power consumption amount to be saved for each electrical appliance 60 may be calculated, and the calculated power consumption amounts may be collected. In addition, predicted incentive information corresponding to the save power consumption amount may be determined.

As described above, when a power-saving operation of the electrical appliance 60 is performed, discomfort levels where the user is to be ready to suffer discomfort may be determined (S24). That is, information on discomfort levels in the power-saving operation of each electrical appliance may be determined and collected based on the information on discomfort levels mapped in Tables 2 and 3.

As the saved power consumption amount is calculated, it may be determined whether the user is to participate in the DR event (S25). For example, there may occur a case where at least one of the plurality of electrical appliances 60 being currently operated is to be turned off so as to achieve a saved power consumption amount requested in the DR signal. In this case, it is determined that the user has difficulty in participating in the DR event.

On the other hand, when the saved power consumption amount is achieved through the power-saving operation of the electrical appliances without turning off the at least one electrical appliance, it is determined that the user is to participate in the DR event.

When it is determined that the user is to participate in the DR event, the user may perform an input for participating in the DR event. For example, a predetermined input for participating in the DR event may be performed through the display device provided in the energy management system 50, any one of the plurality of electrical appliances 60, or the mobile device 100.

Referring to FIG. 6A, a message for asking a user to participate in a DR event may be output on a display unit 120 provided in the mobile device 100. The display unit 120 may further include an input unit through which the user can select to "participate" in the DR event or "reject" the DR event with respect to the message.

The user may select the "participation" through the input unit to participate in the DR event, or may select the "rejection" through the input unit not to participate in the DR event (S26).

If the input for participating in the DR event is performed, a DR power-saving operation for minimizing user's discomfort may be performed.

Specifically, a plurality of control modes of the electrical appliances may be derived to achieve the saved power consumption amount in response to the DR signal. For example, the saved power consumption amount may be achieved through power-saving operations of the washer and the refrigerator. Also, the saved power consumption amount may be achieved through power-saving operations of the air conditioner and the illuminator.

In this case, discomfort levels for each electrical appliance may be considered. If it is assumed that each of the discomfort levels of the washer and the refrigerator is Level 1 when the saved power consumption amount is achieved through the power-saving operations of the washer and the refrigerator, and each of the discomfort levels of the air conditioner and the illuminator is Level 2 when the saved power consumption amount is achieved through the power-saving operations of the air conditioner and the illuminator, it may be determined to perform the power-saving operations of the air conditioner and the illuminator.

That is, among a plurality of selectable power-saving operation modes, a power-saving operation of an electrical appliance having a low discomfort level may be determined and performed according to a user's propensity.

Information on the determined power-saving operation may be displayed on the display unit 120.

Specifically, if the user selects "participation" through the input unit on the display unit 120 as shown in FIG. 6A, information on the kind of an electrical appliance for the power saving operation, information on a time section where the DR event is performed, information on a possible power-saving amount, or information on an incentive corresponding to power saving may be displayed on the display unit 120 as shown in FIG. 6B.

For example, information on check marks indicating that the power-saving operations of the air conditioner and the illuminator are to be performed, information that the time section to which the DR signal is applied corresponds to 13:00 to 14:00, 15 October, information that a predicted power consumption amount to be saved is 5 to 10 KW, or information that a predicted incentive corresponding to the power saving is 2250 to 5500 won (550 won per KW) may be displayed on the display unit 120.

In addition, information on discomfort levels where the user is to be ready to suffer discomfort according to a power-saving operation of each electrical appliance and information on power-saving operations may be displayed on the display unit 120 (S27). For example, information that the discomfort level corresponds to Level 2 and power-saving operation information that the set temperature of the air conditioner is to be increased and the intensity of illumination of the illuminator is to be decreased by 50% may be displayed on the display unit 120.

If the time section for requesting the power saving elapses, information (report) on an actual power-saving amount corresponding to the power-saving operation of the electrical appliance 60 and an actual incentive to be provided based on the power-saving amount may be provided according to the DR signal (S28). For example, the information on the actual power-saving amount and the actual incentive may be displayed on the display unit 120 of the mobile device 100.

Meanwhile, if it is recognized in step S25 that, since a saved power consumption amount requested in the DR signal is large, at least one of the plurality of electrical appliances 60 being currently operated is to be turned off so as to achieve the saved power consumption amount, it may be determined that the user has difficulty in participating in the DR event.

In this case, guide information for allowing the user to participate in the DR event may be provided to the user (S29). The guide information may include information that, if the user turns off at least one of the plurality of electrical appliances 60 to stop an operation of the electrical appliance 60, the saved power consumption amount requested in the DR signal can be achieved.

When the user agrees that the at least one electrical appliance 60 is turned off, subsequent steps from step S27 may be performed in the state in which the at least one electrical appliance 60 is turned off. In this case, which electrical appliance 60 is to be turned off may be determined based on discomfort levels for each electrical or a current power consumption amount.

As an example, an electrical appliance having the lowest discomfort level in the time section to which the DR signal is applied may be turned off. As another example, an electrical appliance having the lowest current power consumption amount may be turned off.

On the other hand, when there is no user's agreement, the power-saving operation of the electrical appliance may not be performed without user's participation in the DR event (S30 and S31).

According to the control method described above, a power-saving operation of each electrical appliance can be performed by considering a user's discomfort level, so that it is possible to save energy while reducing user's discomfort.

According to embodiments, a factor that may have influence on a user's discomfort are graded and set for each electrical appliance, and a power-saving operation for saving power consumption of the electrical appliance is performed based on the set factor, so that it is possible to save energy while reducing user's discomfort.

Also, the graded factor can be maintained or changed based on information on a learned use pattern of the electrical appliance and information on whether a user is to participate in a DR event, so that it is possible to set a discomfort level according to a user's propensity.

Also, the user is provided with information on a graded discomfort level and information on a power consumption amount to be saved and an incentive, so that it is possible to allow the user to easily determine whether to participate in the DR event.

Also, although it is recognized that the user has difficulty in participating in the DR event by considering a current power consumption amount and a power consumption amount to be saved when a DR signal is received, the user can participate in the DR event by turning off at least one electrical appliance, so that it is possible to allow the user to make various selections.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modi-fications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a network system, the method comprising:
    monitoring a power consumption amount of an electrical appliance, based on an operation of the electrical appliance;
    if a demand response (DR) signal for requesting power saving is received, determining whether a user is to participate in a DR event for a power-saving operation of the electrical appliance; and
    if it is determined that the user is to participate in the DR event, performing the power-saving operation of the electrical appliance, based on a mapped information on a discomfort caused by the power-saving operation of the electrical appliance,
    wherein the method further comprises
    setting information on the discomfort having a plurality of discomfort levels, based on a set factor,
    wherein the set factor includes at least one of external temperature information, an operating time or a number of use times of the electrical appliance, and weather information,
    in a state in which the information on the discomfort is set,
    learning information on a use pattern corresponding to the operation of the electrical appliance, and
    learning external information transmitted from an energy supplier or an external database, wherein the information on the use pattern includes a power consumption amount of the electrical appliance, an operating time of the electrical appliance, or a number of operating times of the electrical appliance, and the external information includes time information, weather information, or temperature information,
    wherein the method further comprises:
    downgrading a level of the set factor if the DR signal is received and the user is to participate in the DR event,
    upgrading the level of the set factor if the DR signal is received and the user does not participate in the DR event, and
    maintaining the level of the set factor if the DR signal is received, the user does not participate in the DR event and a value of the level of the set factor is a specific value.

2. The method according to claim 1, comprising:
    if the DR signal is received, calculating a predicted power consumption amount of the electrical appliance to be saved; and
    determining information on a predicted incentive corresponding to the saved power consumption amount.

3. The method according to claim 2, further comprising determining whether the user could participate in the DR event, based on the calculated predicted power consumption of the electrical appliance.

4. The method according to claim 3, wherein, if it is determined that the user is to turn off the electrical appliance so as to achieve a saved power consumption amount requested in the DR signal, it is determined that the user's participation in the DR event is impossible.

5. The method according to claim 1, wherein the mapped information on the discomfort includes information graded based on a discomfort degree for each user.

6. The method according to claim 5, wherein the electrical appliance includes a plurality of electrical appliances, and
wherein, when the power-saving operation for power saving is performed, a discomfort level of one electrical appliance and a discomfort level of another electrical appliance are determined to be different from each other.

7. The method according to claim 6, wherein the performing of the power-saving operation of the electrical appliance includes performing a power-saving operation on an electrical appliance having a relatively low discomfort level among the plurality of electrical appliances.

8. The method according to claim 1, further comprising, if it is determined that the user is to participate in the DR event, displaying information on a kind of an electrical appliance on which a power-saving operation is to be performed, information on a time period where the DR event is performed, information on a possible power-saving amount, or information on an incentive corresponding to power saving.

9. The method according to claim 4, further comprising, if it is determined that the user's participation in the DR event is impossible, outputting guide information for determining whether the electrical appliance is to be turned off.

10. The method according to claim 1, further comprising, if the power-saving operation of the electrical appliance is performed as the user participates in the DR event, displaying information on an actual power-saving amount and information on an incentive to be provided.

11. The method according to claim 5, wherein the information graded based on the discomfort degree for each user is manually input.

12. The method according to claim 10, further comprising, when the incentive is equal to or greater than a set cost, inputting a command for allowing the user to participate in the DR event regardless of the discomfort level.

* * * * *